United States Patent [19]

Durham

[11] Patent Number: 4,707,176

[45] Date of Patent: Nov. 17, 1987

[54] PLANT GROWTH MEDIA CONTAINING RICE HULL ASH

[75] Inventor: Robert L. Durham, Simonton, Tex.

[73] Assignee: Agritec, Inc., Houston, Tex.

[21] Appl. No.: 723,232

[22] Filed: Apr. 15, 1985

Related U.S. Application Data

[63] Continuation-in-part of Ser. No. 270,749, Jun. 4, 1981, abandoned, and a continuation of Ser. No. 497,293, May 23, 1983, abandoned.

[51] Int. Cl.$^4$ .................... C05F 11/00; C05G 3/04
[52] U.S. Cl. .................................... 71/23; 71/903; 47/58; 47/59
[58] Field of Search ............... 71/1, 11, 14, 23–26, 71/903, 904; 47/58, 59; 106/900, 901; 428/402; 405/128, 129

[56] References Cited

U.S. PATENT DOCUMENTS 3,900,378 8/1975 Yen et al. .................... 71/903 X

FOREIGN PATENT DOCUMENTS 0112173 9/1978 Japan .................... 71/23

*Primary Examiner*—Ferris H. Lander
*Attorney, Agent, or Firm*—Fulbright & Jaworski

[57] ABSTRACT

Plant growth media containing rice hull ash in substantially amorphous state and having a porous skeletal structure are disclosed. The rice hull ash is incorporated in naturally occurring soils or so-called synthetic or potting soils. If desired, water swellable binders or polymers can be incorporated with the ash in such soils to enchance their water retention properties. The porous rich hull ash in amorphous form combines synertistically with the soil or soil components to provide desirable growing characteristics as set forth.

17 Claims, No Drawings

PLANT GROWTH MEDIA CONTAINING RICE HULL ASH

CROSS REFERENCE TO RELATED APPLICATION

The present application is a continuation-in-part of application Ser. No. 270,749, filed Jun. 4, 1981 and a continuation of Ser. No. 497,293, filed May 23, 1983, both now abandoned.

BACKGROUND OF THE INVENTION

A soil such as potting soils or regular earth should have the following characteristics for good plant growth:

1. Provide adequate support for growing plants by holding roots firmly in place yet permitting good root penetration from new growth.
2. Hold moisture and nutritional elements in forms and locations where they are easily assimilated by plants.
3. Permit oxygen or general aeration in the root zones to prevent bacterial attack and decay from overwatering.
4. Provide good drainage.
5. Be free of harmful insects, or disease-causing bacteria that are harmful to plants.

To obtain these characteristics, the soil should have internal porosity, be resistant to compaction, have a pH in the range of 6.4 to 7.2, and be free of pathogens and insects.

Most naturally occurring soils do not have all of the foregoing characteristics. Synthetic soils, commonly referred to as potting soils, have been used extensively in the horticultural industry and, properly designed, are actually superior to naturally-occurring soils as a growing medium. U.S. Pat. No. 3,932,166, proposes adding charred wood, sawdust, straw, cardboard, cane bagasse, oat hulls, cotton gin wastes, animal manures, bark and paper as soil conditioners, among other uses. These materials are of low porosity and they readily compact. While a variety of potting soils have been proposed and used in the horticultural industry, these soils do not have all of the foregoing characteristics, and it is necessary to include chemicals to adjust the pH of the soil to obtain maximum growth. Accordingly, it would be highly desirable to provide potting soils and naturally-occurring soils with the foregoing characteristics and, at the same time, be able to selectively modify such characteristics.

SUMMARY

The present invention is directed to plant growth media, such as potting soils, and natural soils modified according to the invention, which have good internal porosity, have resistance to compaction, have a pH in the range of 6.4 to 7.2 and in potting soils are free of pathogens and insects by which the foregoing desireable growth characteristics are obtained. This is accomplished by combining rice hull ash, in a substantially amorphous state and having a porous skeletal structure, with such naturally occurring soils and synthetic soils. The rice hull ash should be present in an amount to improve the growth characteristics and properties of the soils by improving drainage, resisting compaction of the soil and improving the water retention properties of these soils, yet be in a good plant growth pH range. In another embodiment of the invention, one or more water-insoluble, water-retaining binders, such as particulate, water-insoluble, water-swellable, cross-linked polymers are combined with the rice hull ash and such soils for added water-holding properties.

Accordingly, it is an object of the present invention to provide a soil having the aforementioned desirable growth characteristics which may be modified selectively.

A further object of the invention is the provision of a soil, naturally-occurring or synthetic, which has good internal porosity, is resistant to compaction, has a pH in the range of 6.4 to 7.2 and, in the case of potting soil, is free of pathogens and insects.

A further object of the present invention is the provision of such an improved plant growth media or soil which contain rice hull ash in substantially amorphous state and has a porous skeletal structure.

A further object of the present invention is the provision of improved plant growth media which contain rice hull ash in a substantially amorphous state combined with a water-insoluble, water-swellable binder or cross-linked polymer.

A further object of the present invention is the provision of such a plant growth media or soil which are relatively economical and easy to produce.

A further object of the present invention is a method of improving the plant growth properties of potting soils or earth by combining with the soil or earth rice hull ash in a substantially amphorous state with a porous skeletal structure.

A further object of the present invention is a method of improving the plant growth properties of potting soils or earth by combining with the soil or earth rice hull ash in a substantially amorphous state with a porous skeletal structure and a water-insoluble, water-swellable binder or cross-linked polymer.

A further object of the present invention is the growing of plants in potting soil or earth improved by the inclusion of such biogenetic silica ash in amphorous state and having a porous skeletal structure.

Other and further objects, features and advantages appear throughout the specification and claims.

DESCRIPTION OF PRESENTLY PREFERRED EMBODIMENTS

Synthetic soils, commonly referred to as potting soils, are used and marketed extensively in the horticultural industry. Properly designed, these synthetic soils are actually superior to naturally-occurring soils as a growing medium. Other than depending on "Mother Nature", in a synthetic soil, all of the desirable chemical and physical properties are evaluated and ingredients can be chosen to meet specific growing needs of the plant. These ingredients can be chosen to correct any undesirable characteristics of a particular ingredient that otherwise has very desirable characteristics. Conventional potting soil components include vermiculite, perlite, sand, sawdust, wood fiber, fir bark, peat, leaf mold, top soil, various nutrients, trace elements and the like. Many potting soils, however, do not have one or more of the following characteristics: compaction prevention, drainage channels or porosity, aeration pockets, correction of acidic imbalances and trace elements desirable for plant growth.

A synergistic result is obtained by combining rice hull ash, in a substantially amorphous state and with a porous skeletal structure, with soil in an amount effective to provide a growing media in which compaction is prevented, drainage channels and aeration pockets are provided, acidic imbalances are corrected since the ash has a pH of about 8.4 whereas commonly used organic materials and potting soils such as peat moss, ground bark and leaf mold all are acidic with a pH range of about 4 to 6.5, and the ash provides naturally-occurring trace minerals necessary in metabolic processes of plants. Many potting soils and commercial fertilizers do not contain these trace elements, and therefore, the trace elements in the ash helps insure that plants grown in these soils containing the ash are receiving adequate nutrition.

Rice hulls are high in silica content, containing about 18 to 22% by weight, have a porous skeletal silica structure having a porosity of approximately 75 to 80%; that is, about 75 to 80 percent open or void spaces, by volume, a pH of about 8.4 and have naturally-occuring trace elements. Accordingly, rice hull ash when combined in effective amounts with soil, naturally-occuring or synthetic, coacts with the soil or soil components to provide an unexpectedly good, balanced plant growth media with an optimum pH for plant growth without the necessity of adding chemicals for acidic imbalance, adding additional trace elements and the like.

In addition, it has been a continuing severe problem for the Rice Industry to dispose of rice hulls and, while a number and variety of uses for rice hulls and rice hull ash have been proposed and used and are being used, very large volumes of rice hulls are disposed of as waste and some volume of rice hulls are burned and their ash is disposed of by the Rice Industry, at great expense.

Commercially available rice hull ash is prepared by burning rice hulls in a furnace. In the process, raw rice hulls are continually added to the top of the furnace and ash is continuously removed from the bottom. Temperatures in the furnace range from about 800° to about 1400° C., and the time factor for the ash in the furnace is about three minutes. Upon leaving the furnace, the ash is rapidly cooled to provide ease in handling. When treated by this method, the silica remains in a relatively pure amorphous state rather than the crystalline forms known as tridymite or crystobalite. This transition from the amorphous to the crystalline state generally takes place when the silica is held at very high temperatures, for example 2000° C., for longer periods of time. The significance of having the ash in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the ash is in an amorphous state.

The porosity or amount of open or void spaces in the biogenetic silica ash depends on the amount of fines in the ash. The inclusion of fines is not deleterious; however, the more porous the ash the better.

As previously mentioned, amorphous rice hull ash has a porosity of about 75 to 80%; that is, a highly porous structure of about 75 to about 80 percent void space by volume, making it an excellent aeration ingredient and providing channels to promote drainage. This also improves the resiliency of the material which helps avoid compaction. In addition, amorphous rice hull ash has a pH of about 8.4. Since the commonly used organic materials in potting soils such as peat moss, ground bark and leaf mold all are acidic with a pH range of about 4 to 6.5, the rice hull ash is ideal to neutralize the acidity and adjust the pH to a preferred neutral pH for growing plants. Rice hull ash also provides a broad range of naturally-occurring trace minerals necessary in plant metabolic processes. These are illustrated in Table 1.

TABLE 1

| Trace Elements in Rice Hull Ash Analysis Approximate percentages of oxides of various elements (by weight) | |
|---|---|
| Silicon | 92.0 |
| Magnesium | 2.0 |
| Manganese | 0.2 |
| Barium | 0.04 |
| Potassium | 0.02 |
| Iron | 0.1 |
| Aluminum | 0.01 |
| Calcium | 0.1 |
| Copper | 0.001 |
| Nickel | 0.007 |
| Sodium | 0.01 |
| Carbon content (ave.) | 2.5 |
| Moisture (maximum) | 3.0 |
| Bulk Density | 17 to 22 pounds/foot 3 |

Many commercial fertilizers and synthetic soils do not contain these trace elements which are expensive; therefore, the inclusion of amorphous rice hull ash provides these trace elements which helps insure that plants grown in synthetic soils containing rice hull ash are receiving adequate nutrition.

The following Table 2 illustrates that no crystalline silica content was detectable when rice hulls were burned as previously set forth:

TABLE 2

| X-Ray Diffraction Analysis of Rice Hull Ash Samples Determination of Crystalline Silica Content CHEMICAL ANAYLSIS | | |
|---|---|---|
| Sample Identification | % Quartz | % Cristobalite |
| Sample #1 | ND 0.5% | ND 0.5% |
| Sample #2 | ND 0.5% | ND 0.5% |
| Sample #3 | ND 0.5% | ND 0.5% |
| Sample #4 | ND 0.5% | ND 0.5% |
| Sample #5 | ND 0.5% | ND 0.5% |
| Sample #6 | ND 0.5% | ND 0.5% |
| Sample #7 | ND 0.5% | ND 0.5% |
| Sample #8 | ND 0.5% | ND 0.5% |

ND = Not Detected, Less Than

From the foregoing Table 2 it is seen that the rice hull ash is in amorphous and not crystalline form.

While any desired amount of amorphous silica ash can be included in the soil, ash in an amount of from about 20% to about 50% by weight of the complete soil (dry basis) can be used depending on the acidity of the organic matter in the soil and the desired physical characteristics. Since rice hull ash has a pH of about 8.4, the upper limit of rice hull ash that can be used depends upon the pH of the resulting soil mix, which should not be above a pH of about 7.2. Thus, for most soils or soil mixes, 20% to 50% by dry weight of the resulting soil mix provides the desired pH for good plant growth. While rice hull ash is an excellent holder of or reservoir for water, in very arid soils or soils where it is desired to hold an added quantity of water, water insoluble, water-retaining binders, such as particulate, water-insoluble, water-swellable, cross-linked polymers can be used. The amount of the binder or polymer which can be combined with the soil or soil ingredients and rice hull ash can vary from about 0.2 percent to 3.0 percent by weight of the resulting mixture. Preferably, 0.5 percent binder or polymer is used which provides improved water-retention properties of the resulting mix, yet releases the water to the plants as needed. Higher amounts of the binder or polymer, that is, above 3.0 percent tend to bind the water so that it will not be released to the plant as needed. A description of such binders and their manufacturer is set forth in U.S. Pat. Nos. 3,973,355 and 4,238,374.

Typical of these binders are the water-soluble polymers which include any cross-link species of the polymer whose linear analog is water soluble. Typical of such materials are cross-linked monovalent cation salts of polyacrylic, polymethacrylic, polysulfoethyl acrylic and polysulfoethyl methacrylic acids, cross-linked substantially water-insoluble, water-swellable sulfonated alkaryl and aromatic polymers, such as, for example, cross-linked polysodium styrene sulfonate and sulfonated polyvinyl toluene salts; copolymers of such sulfonated alkaryl and aromatic materials with acrylonitriles, alkyl acrylonitriles, acrylates and methacrylates; cross-linked polyvinyl alcohol and polyacrylamide and cross-linked copolymers of polyacrylamide as, for example, the cross-linked copolymer of acrylamide and acrylic acid and of acrylamide and the monovalent salts of acrylic acid; cross-linked heterocyclic monomers, such as polyvinyl morpholinone, poly-5-methyl-N-vinyl-2-oxazolidinone and polyvinyl pyrrolidone; other cross-linked water-swellable but water-insoluble polymers or copolymers can also be employed.

Such materials as the above-named polymers can be made by a variety of known methods. For example, the substantially water-insoluble, water-swellable, cross-linked polyacrylate salts may be prepared by chemical cross-linking as shown in British Pat. No. 719,330, or, alternatively, by subjecting a mixture of a monovalent cation salt of acrylic acid and water to the influences of high energy ionizing radiation for a period of time sufficient to effect the desired polymerization and the cross-linking of at least a portion of the polymer produced. In the latter instance, the amount of ionizing radiation should be at least about 0.5 megarad but greater or lesser amounts may be employed. In any event, the amount of radiation must be great enough to give a swellable polymer which takes in water or aqueous solutions and, in so doing, increases in volume but generally retains its original shape. With this class of polymeric materials, it is critical to the present invention that the salt-forming cation be monovalent. Representative examples of monovalent cations include, for example, the alkali metals, that is, sodium, potassium, lithium, rubidium and cesium, we well as water-soluble ammonium-like radicals based upon the quaternary nitrogen atom.

Other methods for preparing such cross-linked materials may be found in U.S. Pat. No. 2,810,716, issued Oct. 22, 1957, to Markus. The acrylamide polymers and copolymers may be chemically cross-linked, in addition to the materials disclosed in that patent, with methylenebisacrylamide as the cross-linker.

For a further description of such water-insoluble, water-swellable polymers reference is made to U.S. Pats. Nos. 3,090,736 and 3,229,769.

Presently preferred polymers are a hydrolyzed starch, acrylonitrile graft co-polymer, which is manufactured and marketed by General Mills Incorporated; and Norbak, which in the past has been manufactured and marketed by Dow Chemical Company.

The following represents typical examples of plant growth media according to the present invention.

POTTING SOIL FORMULAS CONTAINING RICE HULL ASH

EXAMPLE #1

|  | % By Weight |
| --- | --- |
| Peat Moss | 30 |
| Ground Pine Bark | 30 |
| Rice Hull Ash | 40 |

With this mixture, the synthetic soil mix was loose and not compacted. The average pH was 6.7. When watered, the materials wetted quite well and did not dry out so rapidly as to cause stress in plants.

This mixture was ideal for a broad spectrum of plants that do not require either a highly acidic or basic soil.

EXAMPLE #2

|  | % By Weight |
| --- | --- |
| Ground Bark | 80 |
| Rice Hull Ash | 20 |

This mixture had similar physical properties to Example 1, but the pH was lowered to 6.2 making it ideal for potting azaleas and plants requiring a more acidic pH. Surprisingly, this addition of this amount of biogenetic silica to the bark prevented rapid drying which is one of the problems with bark based synthetic soils.

EXAMPLE #3

|  | % By Weight |
| --- | --- |
| Peat Moss | 33 |
| Rice Hull Ash | 34 |
| Perlite | 33 |

In this mix the rice hull ash was used to replace vermiculite in a soil mix developed by Cornell University and appropriately referred to as Cornell Mix. This is the generally accepted standard synthetic soil used by greenhouse growers for comparison studies. When compared to Cornell Mix, this mixture was less compacted and had nearly identical moisture properties. Moisture control was determined by weighing a given amount of each soil, then thoroughly soaking the soils with water. Then the soils were allowed to drain for 2 hours, weighed, then reweighed at the end of each 24 hour period for five days. The evaporative weight base was within experimental error for the two soil mixes.

EXAMPLE #4

|  | % By Weight |
| --- | --- |
| Peat Moss | 33 |
| Vermiculite | 33 |
| Rice Hull Ash | 34 |

This mixture was similar to Example 3 except it did not drain as well. This is a good mixture for hanging baskets or other planters where rapid drying out is a problem.

EXAMPLE #5

|  | % By Weight |
| --- | --- |
| Ground Bark | 33 |
| Styrofoam beads | 33 |
| Rice Hull Ash | 34 |

A very light potting soil, this mixture was exceptionally loose and drained quite rapidly. This is a good mixture for plants that prefer dryer conditions than normal.

In each of the above soil examples, the rice hull ash was varied from about a 20 percent to about a 50 percent by dry weight level with the generally best consistency found to be about 1/3 of the total mixture. The organic matter, either peat moss or ground bark, was varied depending on the amount of rice hull ash in the mixture.

Generally, in potting soils, there should be an organic material which might be peat moss, ground bark, compacted sawdust, compacted leaf mold or any other organic matter that has been allowed to decompose. This should constitute from 30-90 percent by weight of the mixture. In addition, a material should be added to control moisture, provide aeration and prevent compaction. In the past this has been done to an extent by combining several materials, such as vermiculite and perlite. However, rice hull ash will do the job of both perlite and vermiculite.

Soil can be made with any organic material plus the rice hull ash and possess good properties for moisture control, compaction resistance and aeration. The pH would need to be considered in determining the desired mixture and nutrients could be added at any time when planted with the desired plants.

EXAMPLE #6

In this example 0.2% to 3.0% by weight water-swellable polymer was added to the mixture of Examples 1-5, inclusive. The properties of these potting or synthetic soils was the same as set forth in those examples except that their water retention properties were improved. This is especially advantageous for acid soils, hanging baskets of soils, trickle or other irrigation watering systems.

The following Table 3 illustrates the effect of rice hull ash on the pH of synthetic soils based on either peat moss or ground bark (pine bark).

TABLE 3

| % Rice Hull Ash | % Peat Moss | pH |
| --- | --- | --- |
| 20 | 80 | 6.2 |
| 40 | 60 | 6.7 |
| 60 | 40 | 7.3 |
| 80 | 20 | 7.9 |
| 100 | 0 | 8.4 |

| % Rice Hull Ash | % Pine Bark | pH |
| --- | --- | --- |
| 20 | 80 | 6.5 |
| 40 | 60 | 6.9 |
| 60 | 40 | 7.5 |
| 80 | 20 | 8.0 |
| 100 | 0 | 8.4 |

Knowing that the ideal pH range for most plants is from about 6.4 to about 7.2, the preferred range of rice hull ash in potting soils is from about 20% to about 50% by weight. Below that level, the pH may be too acidic unless another ingredient such as lime is added to offset the acidity. Above 50% rice hull ash the soils become too basic unless additional acidic materials are added to counteract the basic properties of the ash.

The inclusion of rice hull ash alone or with other growing components advantageously can be combined into naturally-occurring earth to enhance its growing properties. This may be worked into the earth in conventional gardening ways, such as in beds, around trees, bushes, and other plants. In addition, the inclusion of rice hull ash alone or with other growth components or with water-soluble polymers is advantageous for use in connection with trickle irrigation systems for moisture control and general agriculture, particularly in arid regions of the world.

In addition, the incorporation of rice hull ash alone or with other growth components or with water soluble binders or polymers enhance the effect of hydromulching or hydroseeding.

One method of the invention is the combining of rice hull ash in amorphous state and a porous structure alone or with water-swellable polymers and/or other plant growth components into potting soil or to work it into regular earth to improve their plant growth characteristics and properties.

Another method of the invention is the growing of plants in potting soil or regular earth which includes rice hull ash in amorphous state and in porous form, alone or with water-swellable polymers and/or other plant growth components.

Accordingly, the present invention is well suited and adapted to attain the objects and has the advantages mentioned as well as others inherent therein.

While presently preferred embodiments of the invention have been given for the purpose of disclosure, changes can be made therein within the scope of the appended claims.

What is claimed is:

1. A soil containing,
   rice hull ash in a substantially amorphous state and having a substantially porous skeletal structure, the rice hull ash effective to improve plant growth characteristics of the soil, and
   the rice hull ash effective to store liquid and air in its pores and to release them to a plant in the soil.

2. A potting soil containing,
   rice hull ash in a substantially amorphous state and having a substantially porous skeletal structure, the rice hull ash being present in an amount to improve plant growth characteristics of the potting soil, and
   the remainder of the potting soil comprising material not subversive of the potting soil,
   the rice hull ash effective to store liquid and air and to release them to a plant in the potting soil.

3. The soil of claims 1 or 2 including,
   a water-swellable polymer present in an amount effective to improve water retention properties of the soil yet release water to the plant.

4. The soil of claims 1 or 2, where, from about 20% to about 50% by weight, of the rice hull ash is present in the soil.

5. The soil of claims 1 or 2 where,
   from about 20% to about 50% by weight of the rice hull ash is present in the soil, and
   the soil includes a water-swellable polymer in an amount to improve water retention properties of the soil yet release water to the plant.

6. A plant growth medium comprising, rice hull ash in a substantially amorphous state having a substantially porous skeletal structure, and the remainder being particulate plant growth material, the rice hull ash being present in an amount effective to improve plant growth characteristics of the plant growth medium.

7. The plant growth medium of claim 6 including, a water-swellable polymer in an amount effective to improve water retention properties of the plant growth medium yet release water to a plant in the plant growth medium.

8. A potting soil containing, rice hull ash in a substantially amorphous state and having a substantially porous skeletal structure, the remainder being particulate plant growth material, the ash being present in an amount sufficient so that the pH of the potting soil is in a range of from about 6.4 to about 7.2 and is characterized by good internal porosity, water and air retention, and resistance to compaction.

9. The potting soil of claim 8 including, a water-swellable polymer in an amount effective to improve water retention of the potting soil.

10. A method of improving plant growth soil comprising, combining with the soil an amount of rice hull ash in a substantially amorphous state and having a substantially porous skeletal structure in an amount effective to improve internal porosity, water and air retention and resistance to compaction of the plant growth soil.

11. The method of claim 10 including, combining with the soil a water-swellable polymer in an amount effective to improve water-retention characteristics of the soil.

12. A method of making a potting soil comprising, combining particulate potting soil material and rice hull ash, the rice hull ash being in an amorphous state and having a substantially porous skeletal structure and being present in an amount effective to provide good drainage, water and air retention and resistance to compaction of the resulting potting soil.

13. The method of claim 12 where, a water-swellable polymer is also combined with the potting soil material and rice hull ash in an amount effective to provide improved water retention characteristics of the resulting potting soil yet release water to a plant in the potting soil.

14. An improved method of growing plants comprising, growing the plants in soil containing rice hull ash in a substantially amorphous state and in a substantially porous skeletal form, the rice hull ash being present in an amount effective to improve growth characteristics of the soil.

15. The method of claim 14 where, the soil also contains a water-swellable polymer in an amount effective to improve water holding properties of the soil yet release water to a plant in the soil.

16. The method of claim 14 where, the rice hull ash is present in an amount of about 20% to about 50% by weight of the soil.

17. The method of claim 15 where, the rice hull ash is present in an amount of from about 20% to about 50% by weight of the soil.

* * * * *

UNITED STATES PATENT OFFICE
CERTIFICATE OF CORRECTION

Patent No. 4,707,176　　　　　　　　　　Dated November 17, 1987

Inventor(s) Robert L. Durham

It is certified that error appears in the above-identified patent and that said Letters Patent are hereby corrected as shown below:

Column 1, lines 58-59, "desireable" should read --desirable--.

Column 3, line 18, "naturally-occuring" should read --naturally-occurring--.

Column 3, line 20, "naturally-occuring" should read --naturally-occurring--.

Column 5, line 52, "we well" should read --as well--.

Signed and Sealed this

Fifth Day of July, 1988

Attest:

DONALD J. QUIGG

Attesting Officer　　　　Commissioner of Patents and Trademarks